US011163985B2

(12) United States Patent
Nguyen et al.

(10) Patent No.: US 11,163,985 B2
(45) Date of Patent: Nov. 2, 2021

(54) EVALUATING THE SECURITY OF A FACIAL RECOGNITION SYSTEM USING LIGHT PROJECTIONS

(71) Applicant: Visa International Service Association, San Francisco, CA (US)

(72) Inventors: Luan Nguyen, East Lansing, MI (US); Sunpreet Singh Arora, San Mateo, CA (US); Yuhang Wu, Foster City, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 149 days.

(21) Appl. No.: 16/752,336

(22) Filed: Jan. 24, 2020

(65) Prior Publication Data
US 2021/0232808 A1  Jul. 29, 2021

(51) Int. Cl.
*G06K 9/00* (2006.01)
*H04N 9/31* (2006.01)
*G06T 3/00* (2006.01)
*G06K 9/62* (2006.01)

(52) U.S. Cl.
CPC ....... *G06K 9/00288* (2013.01); *G06K 9/6262* (2013.01); *G06T 3/00* (2013.01); *H04N 9/3185* (2013.01); *G06T 2207/20084* (2013.01)

(58) Field of Classification Search
CPC ............ G06K 9/00288; G06K 9/6262; G06K 9/00899; H04N 9/3185; G06T 3/00; G06T 2207/20084
See application file for complete search history.

(56) References Cited

U.S. PATENT DOCUMENTS

| | | | | |
|---|---|---|---|---|
| 2006/0093183 | A1* | 5/2006 | Hosoi | G06K 9/00255 382/103 |
| 2007/0165244 | A1* | 7/2007 | Yukhin | G06K 9/00255 356/603 |
| 2016/0140405 | A1* | 5/2016 | Graumann | G06K 9/00288 382/118 |

OTHER PUBLICATIONS

Nguyen, Dinh-Luan, et al., "Adversarial light projection attacks on face recognition systems: A feasibility study," Proceedings of the IEEE/CVF Conference on Computer Vision and Pattern Recognition Workshops, 2020 (Year: 2020).*
(Continued)

*Primary Examiner* — Andrew M Moyer
(74) *Attorney, Agent, or Firm* — Kilpatrick Townsend & Stockton LLP (57) ABSTRACT

Embodiments of the invention are directed to systems, methods, and devices for testing the security of a facial recognition system (FRS). A target image depicting a target person enrolled in the FRS and a tester image depicting a tester may be obtained. A plurality of transformed images may be generated from an image of the target person or the tester image. A processed tester image (e.g., one that is likely to cause the FRS to misclassify) may be identified using the plurality of transformed images, the tester image, and the target image. Data representing a light pattern can be generated using the processed tester image and the light pattern can be projected onto a second person. Another image may be captured of the second person with the light pattern as projected. This image may be provided to the FRS and a remedial action may be performed based on the corresponding output.

20 Claims, 6 Drawing Sheets

(56) References Cited

OTHER PUBLICATIONS

Goodfellow et al., "Explaining and Harnessing Adversarial Examples", International Conference on Learning Representations (ICLR), 2015, 11 pages.
Liu et al., "SphereFace: Deep Hypersphere Embedding for Face Recognition", CVPR'17, In Proceedings of the IEEE conference on computer vision and pattern recognition, 2017, pp. 212-220.
Madry et al., "Towards Deep Learning Models Resistant to Adversarial Attacks", Available Online at: https://arxiv.org/abs/1706.06083, Sep. 4, 2019, 28 pages.
Schroff et al., "Facenet: A Unified Embedding for Face Recognition and Clustering", In Proceedings of the IEEE Conference on Computer Vision and Pattern Recognition, 2015, pp. 815-823.
Sharif et al., "Accessorize to a Crime: Real and Stealthy Attacks on State-of-the-Art Face Recognition", In Proceedings of the 2016 ACM SIGSAC Conference on Computer and Communications Security, Oct. 2016, pp. 1528-1540.
Shi et al., "Curls & Whey: Boosting Black-Box Adversarial Attacks", Available Online at: arXiv preprint arXiv:1904.01160, Apr. 2, 2019, 14 pages.
Tu et al., "Autozoom: Autoencoder-Based Zeroth Order Optimization Method for Attacking Black-Box Neural Networks", Jan. 31, 2020, 13 pages.

* cited by examiner

EVALUATING THE SECURITY OF A FACIAL RECOGNITION SYSTEM USING LIGHT PROJECTIONS

BACKGROUND

Facial recognition systems are being increasingly used in a variety of applications ranging from border control and law enforcement to access control and payments. Facial recognition systems typically use a camera to capture a facial image of a subject to recognize the subject. The facial image of a subject captured at the time of recognition is compared to enrolled faces to verify a claim of identity or determine the identity of the subject. While security mechanisms can be enforced to safeguard the enrolled facial images, an adversary can potentially trick the facial recognition system by providing a malicious input to the camera directly at the time of recognition. One class of attacks called presentation or spoofing attack achieves this by using physical spoofs to mimic an enrolled user's facial image (e.g. by using two-dimensional printed face photos, or three-dimensional masks). Another class of attacks called physical adversarial attack uses adversarial machine learning to generate adversarial patterns that can be combined with the adversary's facial appearance so that the facial recognition system inaccurately classifies the resulting facial image as an enrolled user's facial image.

To defend against physical adversarial attacks, it is important to have an evaluation system that is able to simulate different adversarial patterns in the physical experimental setting, so that the robustness of the facial recognition system can be systematically evaluated.

Embodiments of this disclosure address these and other problems, individually and collectively.

SUMMARY

One embodiment of the invention is directed to a method for testing the security of a facial recognition system. The method may comprise obtaining, by a computing device (e.g., a failure detection device), a target image depicting a target person enrolled in the facial recognition system and an adversarial image depicting a tester. The method may further comprise generating, by the computing device, a plurality of transformed images based at least in part on applying, by the computing device, a plurality of transformations to at least one of: the adversarial image or the target image. The method may further comprise generating, by the computing device, a processed tester image based at least in part on the plurality of transformed images, the adversarial image, and the target image. The method may further comprise generating, by the computing device, data representing a light pattern based at least in part on the processed adversarial image. The method may further comprise providing, by the computing device, the data representing the light pattern to a projection device. In some embodiments, the projection device may be configured to project the light pattern onto the tester. The method may further comprise receiving, by the computing device, a subsequent tester image. In some embodiments, the subsequent tester image may depict a second person with the light pattern projected on the second person. The method may further comprise providing, by the computing device, the subsequent tester image as input to the facial recognition system. The method may further comprise performing, by the computing device, one or more remedial actions based at least in part on output generated by the facial recognition system.

Another embodiment of the invention is directed to a computing device (e.g., a failure detection device) comprising one or more processors and a memory comprising computer-executable instructions that, when executed by the one or more processors, causes the computing device to perform the method above.

Another embodiment of the invention is directed to a failure detection system comprising an image capture device, a projection device, and a computing device (e.g., a failure detection device). The computing device may comprise one or more processors and a memory comprising computer-executable instructions that, when executed by the one or more processors, causes the computing device to perform the method above.

Further details regarding embodiments of the invention can be found in the Detailed Description and the Figures.

DETAILED DESCRIPTION

Embodiments of the present invention are directed to testing the security of facial recognition systems. As discussed above, facial recognition systems can be fooled using physical items that aim to mimic the target (e.g. two-dimensional printed face photos, three-dimensional masks, glasses, etc.). To defend against physical adversarial attacks, it is important to have an evaluation system that is able to simulate these and different physical attacks, so that the robustness of the facial recognition system can be systematically evaluated.

Prior to discussing specific embodiments of the invention, some terms may be described in detail.

The term "computing device" generally refers to a device that performs computations. A computing device may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "failure detection device" may include one or more computing devices configured to detect a failure of another system (e.g., a facial recognition system). In some embodiments, the failure detection device can be a large mainframe, a minicomputer cluster, or a group of server computers functioning as a unit. The failure detection device may be coupled to one or more databases and may include any hardware, software, other logic, or combination of the preceding, for detecting failures in other systems (e.g., facial recognition systems).

An "image capture device" may be any suitable device configured to capture digital images. Examples of an image capture device may include a digital camera, a tablet computer, a smartphone, a smartwatch, a desktop computer, a laptop computer, and the like.

A "projection device" may be any suitable device capable of projecting one or more rays of light. An example of a projection device may include a projector or any suitable device configured to project images upon a surface under a threshold distance from the projection device.

A "facial recognition system" may be a system configured to identify and/or verify (recognize) a person from facial features included in a digital image. Some facial recognition systems identify facial features in an input image to facial features of a database of facial images to determine whether the subject of the input image is enrolled in the system.

An "tester" may refer to a person that seeks to mimic a target person (e.g., a person who seeks to evaluate a facial recognition system). An "tester image" may be a digital image of a tester.

A "target person" may refer to a person who is enrolled in a facial recognition system. A "target image" may refer to an image of a target person.

A "representational image" may refer to an image that represents multiple images. By way of example, a representational tester image (e.g., a type of representational image) can be an average (or otherwise representational) of multiple tester images. Similarly, a representational target image (e.g., a type of representational image) can be an average (or otherwise representational) multiple target images.

A "binary mask" may refer to an image in which each pixel is stored as a single bit (e.g., binary 0 or 1). Binary masks may be utilized to filter and/or select particular pixels of images for modification.

A "gradient" of a function, vector, or matrix may refer to a directional rate of change of the function, vector, or matrix. The gradient may be computed as the directional change with respect to a scalar, vector, or matrix. The gradient of an image may refer to a directional change in the intensity or color of an image. A gradient of an image can be utilized for edge detection. Mathematically, a gradient at each image pixel can be expressed as a two-dimensional vector with the components given by the derivatives in the horizontal and vertical directions. At each image pixel, the gradient vector may indicate the direction of largest possible intensity increase, and the length of the gradient vector can correspond to the rate of change in that direction.

A "neural network" is a series of algorithms that endeavors to recognize underlying relationships in a set of data through a process that mimics the way the human brain operates. Some facial recognition systems use neural network to identify facial features of input images.

A "convolutional neural network" is a class of deep neural networks, most commonly applied to analyzing images. A convolutional neural network (CNN) may include multiple layers (e.g., convolutional layers, fully connected layers, etc.). Convolutional layers may be used for feature extraction from an input image, for example, while fully connected layers may be used for classification. CNNs employ a mathematical operation called convolution. Convolution may refer to a specialized kind of linear operations. CNNs are neural networks that use convolution in place of general matrix multiplication in at least one of their multiple layers of perceptrons.

A "landmark point" may be any suitable point on a human face that is associated with a particular facial feature (e.g., the top of the subject's nose, the right-most point of the subject's right eye, the right-most point of the subject's mouth, etc.).

A "calibration matrix" may refer to a matrix parameters that map measurements from one domain to another. A calibration matrix may be used to identify how each pixel of a first image associated with a first viewpoint is to be moved or how each pixel's color/intensity is to be modified so as to cause a second image of a second viewpoint to be substantially equal to the first image. Transformations may include, but are not limited to, rotations, scaling, shifting, color modifications, intensity changes, and the like.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Conventional adversarial pattern generation methods (e.g., Fast Gradient Sign Method (FGSM), Projected Gradient Descent (PGD), Carlini and Wagner (CW) attack, etc.) focus on optimizing an objective function J. In case of impersonation attacks where a tester is attempting to mimic a target, the following optimization is typically solved:

$$\operatorname*{argmin}_{x^{adv}} J(x^{adv}, y^{target}) \text{ s.t. } M(x^{adv}, x^{real}) < \varepsilon$$

Where the notations above are provided below in Table 1.

TABLE 1

| Notation | Meaning |
|---|---|
| $x^{adv}$ | Adversarial image |
| $x^{real}$ | Original input image |
| $J$ | Cost function |
| $y^{target}$ | Target class/embedding |
| $y^{real}$ | Original input class/embedding |
| $\varepsilon$ | Threshold |
| $\mathcal{T}_i$ | $i^{th}$ transformation function |
| $w_i$ | Weight corresponding to $\mathcal{T}_i$ |
| $x^{avg}$ | Weighted average of different transformations on the input image |
| $M_i$ | Transformation matrix to transform $\mathcal{T}_i(x^{real})$ to $x^{avg}$ |
| $m_i$ | Transformation matrix to transform $x^{real}$ to $\mathcal{T}_i(x^{real})$ |
| $\mathcal{M}$ (a, b) | Distance metric between two variables a and b |

Sometimes the tester may instead attempt to evade recognition (e.g., fool the facial recognition system into classifying their image as someone else). For situations in which the tester is trying to evade recognition, the optimization function that is solved is typically:

$$\operatorname*{argmin}_{x^{adv}} J(x^{adv}, y^{target}) \text{ s.t. } \mathcal{M}(x^{adv}, x^{real}) < \varepsilon.$$

The conventional techniques discussed above either minimize (for obfuscation) or maximize (for impersonation) the similarity between the input image and the target image while constraining the differences in pixels to be smaller than threshold $\varepsilon$ to make the adversarial pattern imperceptible. The metric $\mathcal{M}$ can be any distance metric such as L1/L2, cosine, wasserstein, etc.

The systems and methods disclosed herein provide benefits over conventional techniques for impersonation and obfuscation by utilizing multiple images of the target and/or multiple images of the tester to cause the data representing the light pattern generated to be more resistant/invariant to transformations (e.g., due to camera capture, due to the tester moving during capture, etc.).

For example, for impersonation $x^{adv}$ (e.g., a processed tester image) can be found by solving the following optimization problem:

$$\operatorname*{argmin}_{x^{adv}} J(x^{adv}, y^{target}) \text{ s.t. } \|x^{adv}, x^{real}\|_\infty < \varepsilon,$$

where $y^{avg} = \sum_{i=1}^{k} w_i y_i$ is representative of the target y and $x^{avg} = w_0 x^{real} + \sum_{i=1}^{k-1}(w_i * \mathcal{T}_i(x^{real})) = M x^{real} = M_i \mathcal{T}_i(x^{real}) = M_i m_i x^{real}$ with i=1 ... k-1 and $\Sigma_i w_i = 1$.

A set of predefined transformations $\mathcal{T}$ (e.g., translation, rotation, and scaling over a fixed parameter range) may be defined. Each transformation $\mathcal{T}_i$ is then sampled from this distribution of predefined transformations. An optimization algorithm that generates a transformation invariant tester image (e.g., a processed tester image likely to fool the facial recognition system being tested) may be utilized. One example optimization algorithm will be discuss in detail in connection with FIG. 5. Once a processed tester image is identified, the transformations needed to modify the original tester image may be calculated and data representing a light pattern may be determined. The light pattern may be projected over the tester and an resultant image may be captured. The resultant image may be provided to the facial recognition system to determine if the resultant image was able to cause a misclassification by the facial recognition system.

Figure 1:
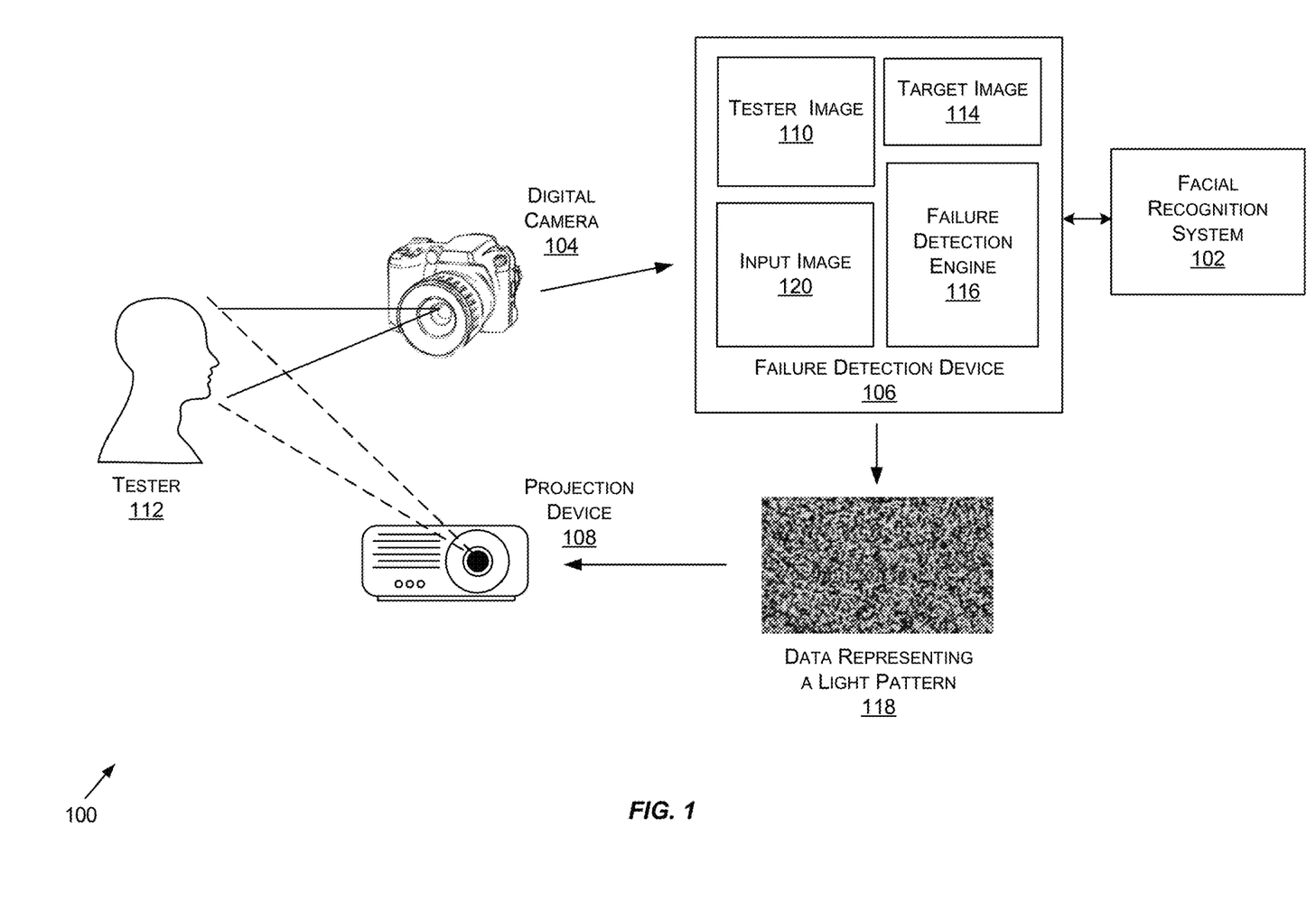
FIG. 1 shows a block diagram of a system for testing the security of a facial recognition system, according to some embodiments.

FIG. 1 shows a block diagram of a failure detection system 100 for testing the security of a facial recognition system (e.g., facial recognition system 102), according to some embodiments. The failure detection system 100 may include a digital camera 104, a failure detection device 106, and a projection device 108.

The digital camera 104 may be an example of an image capture device. It should be appreciated that digital camera 104 is used merely for illustration and that any suitable device including a device configured to capture digital images may be similarly utilized. The digital camera 104 may be utilized to capture an image (e.g., tester image 110) of the tester 112. The tester 112 may be seeking to mimic a target person. Thus, an image of that target person (e.g., target image 114) may be obtained by the failure detection device 106 utilizing any suitable input/output device. It may be the case that target image 114 is already known (e.g., obtained from storage accessible to the failure detection device 106).

In some embodiments, a failure detection engine 116 (e.g., a component of the failure detection device 106) may utilize the tester image 112 and the target image 114 to generate data representing a light pattern 118. Projecting the light pattern 118 may include any suitable number of rays of any suitable light in a pattern determined by the failure detection engine 116. In some embodiments, the failure detection device 106 may provide the data representing the light pattern 118 to the projection device 108 in order to project light pattern toward the tester 112 (e.g., onto the face of tester 112). The projection device may be any suitable device configured to project one or more rays of light according to input provided by at least the failure detection device 106.

The digital camera 104 can be utilized to capture input image 120. Input image 120 may be an image depicting the tester 112 with light corresponding to the light pattern 118 as projected by the projection device 108.

The failure detection engine 116 may provide the input image 120 to the facial recognition system 102. In some embodiments, the facial recognition system 102 may include a deep-learning neural network (e.g., a convolutional neural network) that has been previously trained to classify input images (e.g., facial images). In some embodiments, the facial recognition system 102 may be configured to attempt to classify the input image as one of a collection of previously-stored images. These previously-stored images may correspond to any suitable number of users who have previously been enrolled in the facial recognition system 102. The facial recognition system 102 may be configured to perform a different set of operations (e.g., one or more remedial actions) when a user is classified as an enrolled user (e.g., a particular enrolled user) versus when the user is classified as not being enrolled in the system. For example, the facial recognition system 102 may 1) respond with an indication that the input image 120 is recognized as an enrolled person (e.g., the target person) or 2) respond with an indication that the input image 120 is not recognized as an enrolled person.

As another example, the facial recognition system 102 may control access to a resource (e.g., building access, account data, banking information, private data, or any access-controlled physical or digital object). Some remedial actions performed by the facial recognition system 102 may include granting access to a resource (e.g., when the input image 120 is identified as being an enrolled person), denying access to the resource (e.g., when the input image 120 is identified as not being enrolled), triggering an alarm (e.g., when the input image is identified as not being enrolled), and responding with an indication that the input image is enrolled or non-enrolled. It should be appreciated that other remedial actions are numerous and may vary depending on context in which facial recognition system 102 is used.

As another example, the tester 112 may himself be enrolled in the facial recognition system 102. In some embodiments, the goal may not be directed to mimicking another person as described above. Rather, it may be desirable to test the accuracy of the facial recognition system 102 by attempting to evade recognition. In this use case, the tester may desire to generate a light pattern that makes the facial recognition system misidentify him or her as another random subject.

In such examples, the failure detection engine 116 may be utilized to generate the data representing the light pattern 118 which may be provided to the projection device 108 and projected on the face of the tester 112. Data representing the light pattern 118 may be utilized to test whether the facial recognition system 102 misclassifies the input image 120 (e.g., an image of the light pattern 118 overlaid over the face of the tester 112) as being an image of a person different from the tester 112.

Using the techniques described herein, the tester 112 can use the failure detection system 100 create one or more light patterns given one or more target subjects to test the security of the facial recognition system 102 against adversarial attacks.

Figure 2:
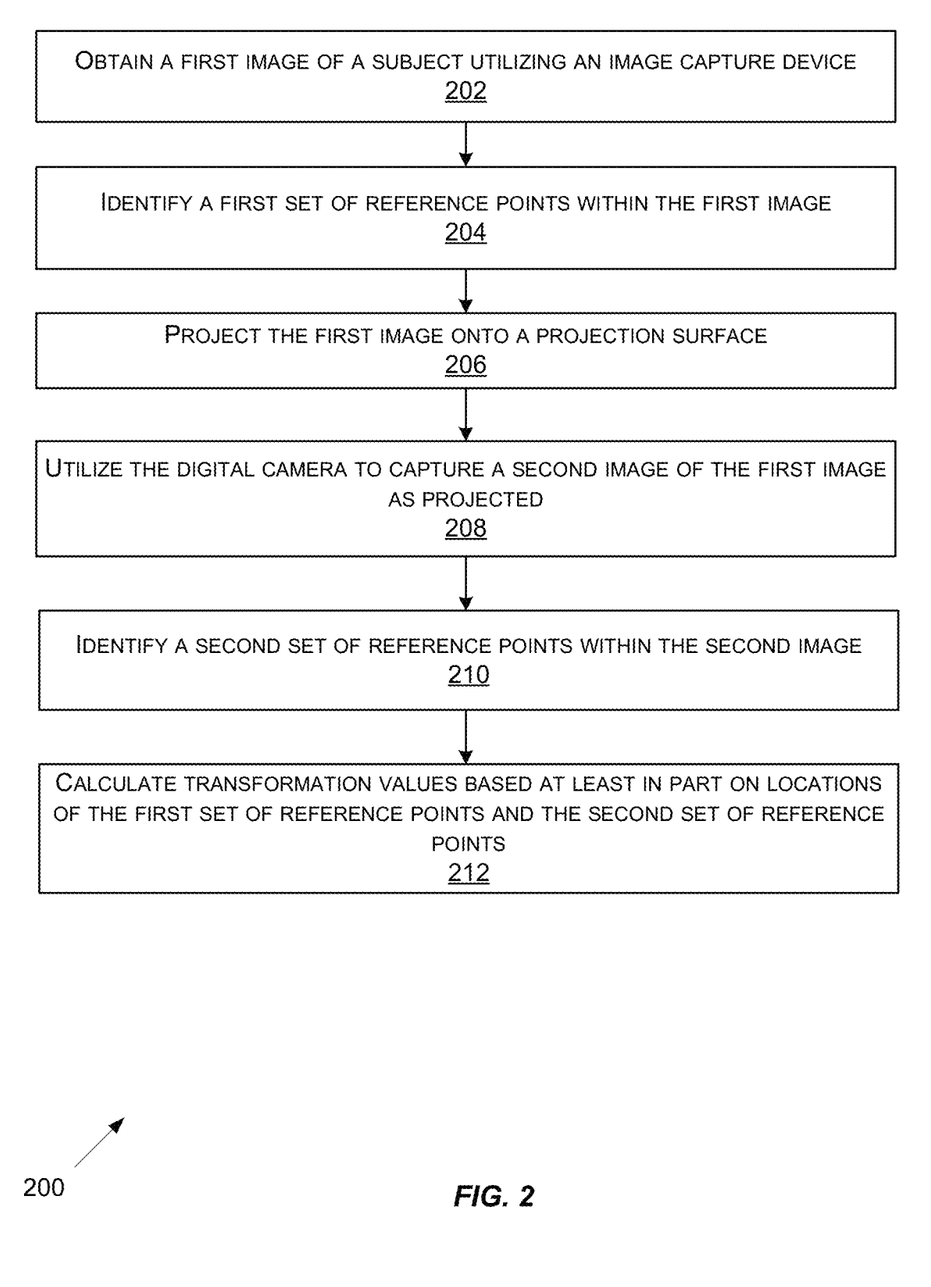
FIG. 2 shows a flow diagram illustrating an exemplary method for calibrating a failure detection system, according to some embodiments.
Figure 3:
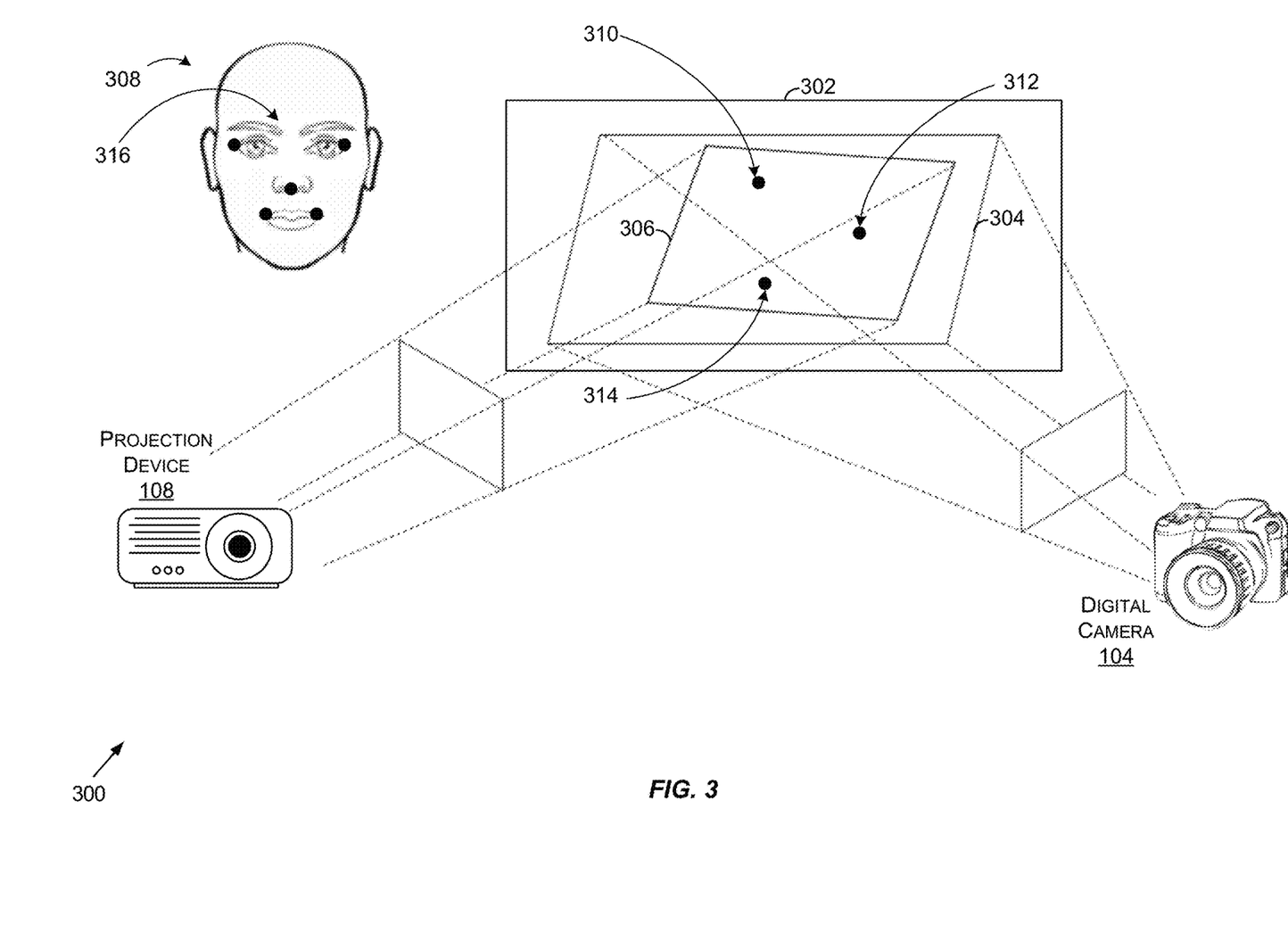
FIG. 3 shows a block diagram depicting the exemplary method of FIG. 2, according to some embodiments.

FIG. 2 shows a block diagram depicting an exemplary method 200 for calibrating a failure detection system, according to some embodiments. The method 200 may be performed using an image capture device (e.g., the digital camera 104 of FIG. 1), a failure detection device (e.g., the failure detection device 106 of FIG. 1), and a projection device (e.g., the projection device 108 of FIG. 1). FIG. 3 depicts one possible configuration of the projection device 108 and the digital camera 104. In FIG. 3, the digital camera 104 and the projection device 108 are both angled toward a surface 302. Digital camera 104 may be positioned at an angle that enables the digital camera to capture an image from the area 304 of surface 302. Projection device 108 may be pointed toward the surface 302 at an angle that enables the projection device 108 to project light within the area 306 of surface 302, as depicted in FIG. 3.

The method 200 may begin at 202, where a first image of a subject is obtained utilizing an image capture device. The first image of a subject may correspond to an image of the tester 112 of FIG. 1 (e.g., the tester image 110). A simplified version of the tester image 110 is provided by the tester image depicted at 308 of FIG. 3.

Returning to FIG. 2, at 204, a first set of reference points may be identified within the first image. In some embodiments, a user of the failure detection device 106 of FIG. 1 may manually select any suitable number of reference points (e.g., three, five, 15, etc.). By way of example, the user may be presented the first image via an interface provided by the failure detection engine 116 of FIG. 1. Using an input device (e.g., a mouse, a finger for touch input, etc.), the user may select the points 310, 312, and 314. As another example, a number of reference points may be automatically selected by the failure detection engine 116. Additionally or alternatively, the failure detection engine 116 may be configured to identify a number of landmark points. A "landmark point" may be any suitable point on a human face that is associated with a particular facial feature (e.g., the top of the subject's nose, the right-most point of the subject's right eye, the right-most point of the subject's mouth, etc.). Some landmark points may be depicted at 316. From left to right and top to bottom the points depict: the right-most point of the subject's right eye, the left-most point of the subject's left eye, the tip of the subject's nose, the right-most point of the subject's mouth, and the left-most point of the subject's mouth. It should be appreciated that any suitable number of landmark points may be utilized and that the particular landmark points utilized may differ from those depicted at 316.

At 206 of FIG. 2, the first image may be projected onto a projection surface (e.g., the surface 302 of FIG. 3). That is, once the image of the subject has been captured by the digital camera 104, and the reference points identified, the image may be provided to the projection device 108 and projected toward the surface (e.g., the surface 302 of FIG. 3). For example, the projected version of the image may appear to span area 306 of FIG. 3.

At 208, the image capture device (e.g., the digital camera 104) may be utilized to capture a second image of the first image as projected. That is, the image of the subject as projected to span the area 306 may be captured by the image captured device.

At 210, a second set of reference points may be identified within the second image. The second set of reference points identified may be the same set of reference points identified at 204. As a non-limiting example, if the landmark points depicted at 316 were utilized, those same landmark points may be identified from the image projected on area 306 and captured by the digital camera 104.

At 212, transformation values may be calculated based at least in part on locations of the first set of reference points and the second set of reference points. By way of example, coordinate transformations and/or color transformations between the reference points captured in the first image and as captured in the second image may be identified. These coordinate and/or color/intensity transformations may be utilized to generate a calibration matrix. A calibration matrix may be utilized to identify how each pixel of a first image associated with a first viewpoint is to be moved or how each pixel's color/intensity is to be modified so as to cause a second image of a second viewpoint to be substantially equal to the first image. The calibration matrix may be utilized to compensate for the different viewpoints/angles of the camera and projector. For example, the calibration matrix may be utilized to identify how location, color, and/or intensity of pixels projected by the projection device 108 and captured by the digital camera 104 are to be modified to compensate for the differing angles of the projection device 108 and the digital camera 104. Once the calibration matrix has been generated, the projection device 108 and the digital camera 104 can be thought of as being calibrated with one another with respect to their respective positions/angles.

Figure 4:
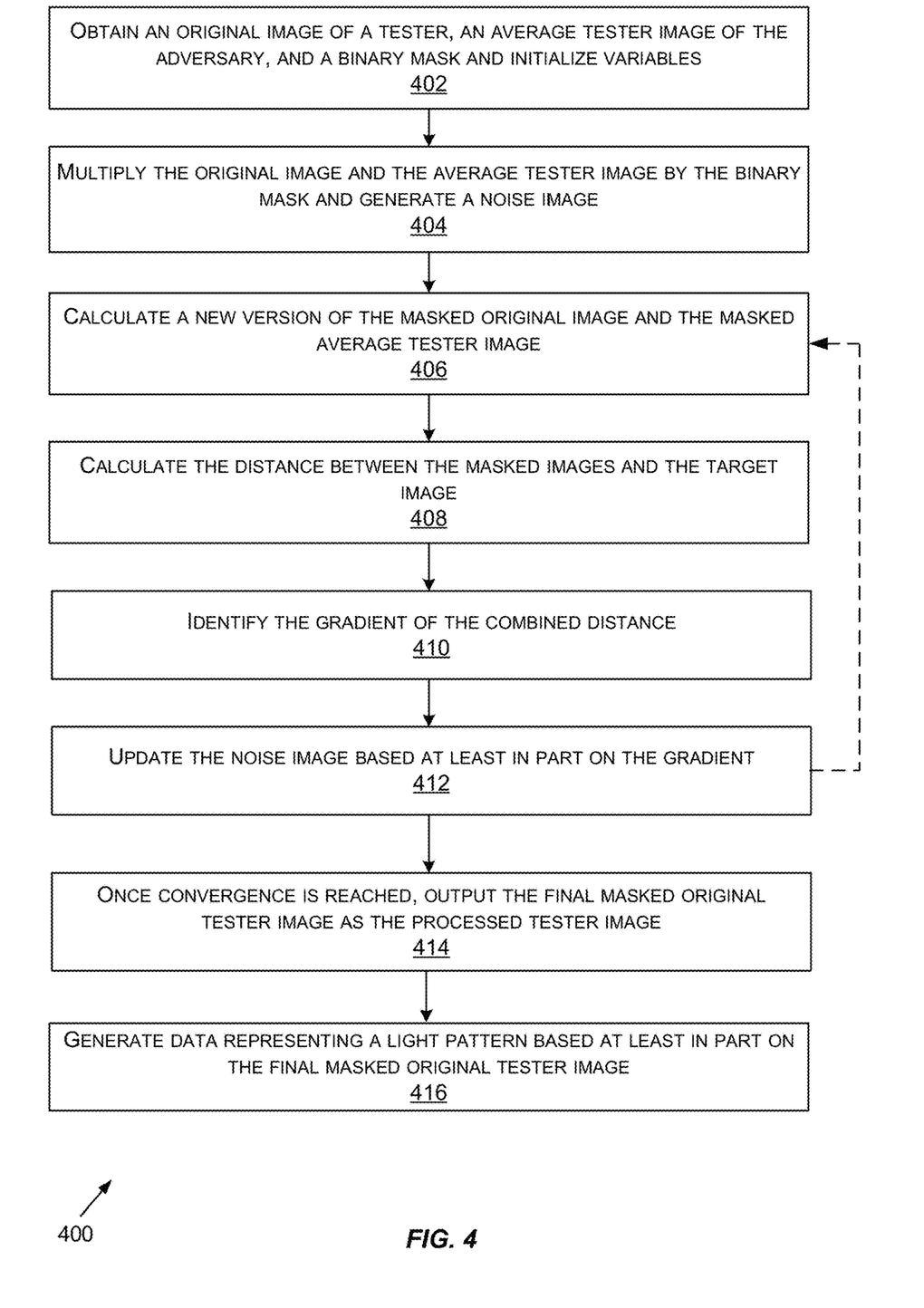
FIG. 4 shows a flow diagram illustrating an exemplary optimization process for generating data representing a light pattern, according to some embodiments.

FIG. 4 shows a flow diagram illustrating an exemplary optimization method 400 for generating data representing a light pattern, according to some embodiments. The method 400 may be performed by the failure detection engine 116 of FIG. 1.

The method 400 may begin at 402, where the original tester image (x), an average tester image ($x^{avg}$), and a binary mask ($I^{mask}$) may be obtained and a variety of variables may be initialized. In some embodiments, the binary mask may be omitted. However, embodiments that utilize the binary mask can be utilized to test sensitivity/robustness of the system to perturbations in a particular facial region. The original image of the tester (x) may correspond to the tester image 110 of FIG. 1. An average image of the tester refers to a type of representational tester image (e.g., an averaged combination of two or more tester images). In some embodiments, prior to performing the method 400, the failure detection engine 116 may be configured to generate any suitable number of transformed images.

Figure 5:
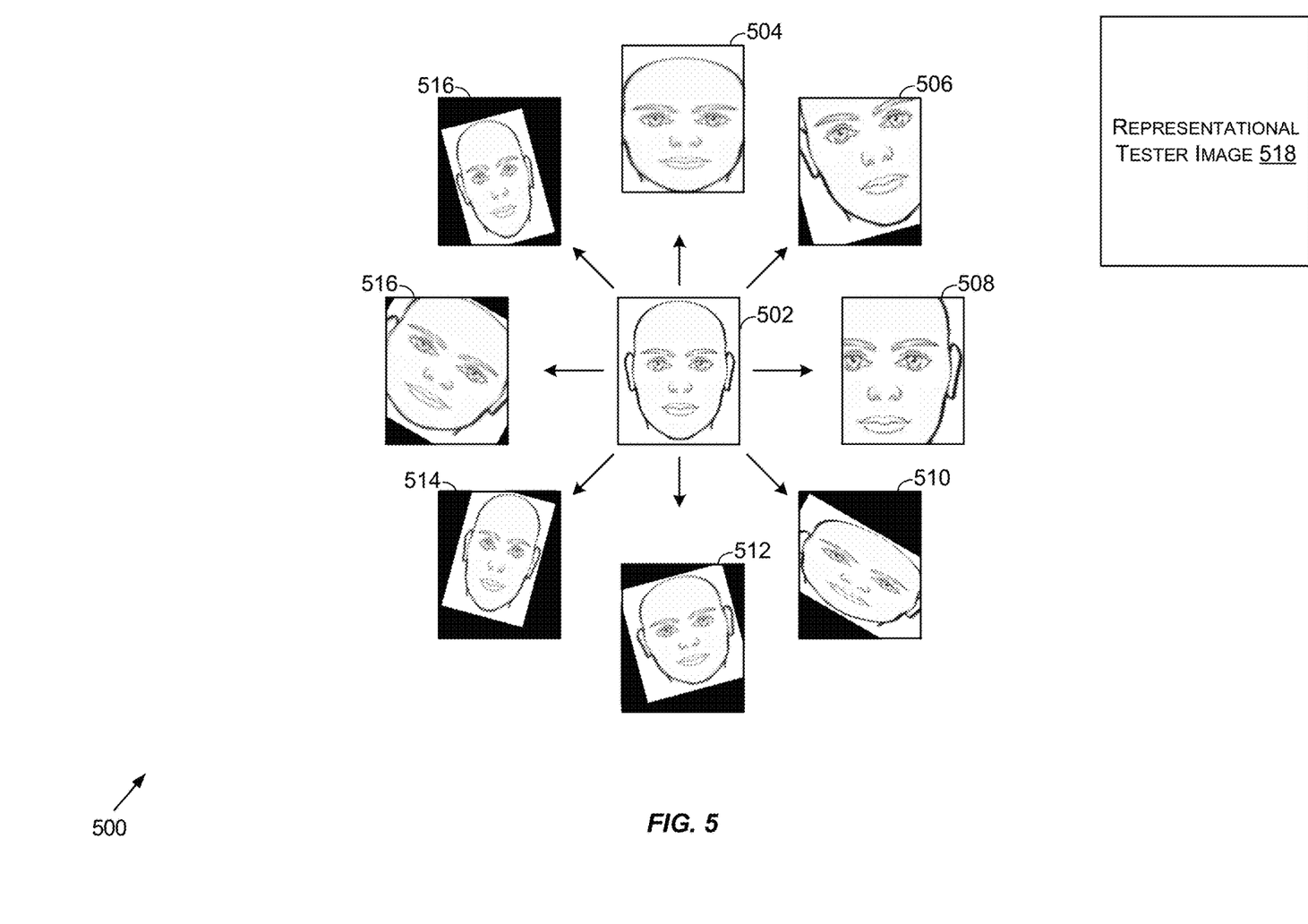
FIG. 5 shows a block diagram depicting a set of transformed images, according to some embodiments.

For example, FIG. 5 shows a block diagram depicting a set of transformed images (e.g., images 504-516), according to some embodiments. In some embodiments, the failure detection engine 116 may store a map of any suitable number of transformations. A transformation may include scaling, rotating, shifting, and/or modifying the color or intensity of each pixel of an image to create a transformed image. In some embodiments, each transformation may be stored as a transformation matrix. Any suitable number of transformation matrices may be identified (e.g., by a random sampling of a set of predefined transformation, according to a set of rules for selecting predefined transformations from a set of redefined transformations, etc.). For example, eight transformation matrices may be identified from a set of predefined transformations. The image 502 may correspond to the tester image 110 of FIG. 1. By applying each of the transformation matrices to the image 502, images 504-516 may be generated. Images 504-516 are utilized for illustration purposes only. The particular number and type of transformations may be numerous and vary. The locations, colors, and intensities of each pixel within each of the images 504-516 may be combined (e.g., averaged, combined according to a predefined scheme, etc.) in order to generate a representational tester image (e.g., representational tester image 518). In some embodiments, the image 502 may be utilized with the images 504-416 to generate a representational tester image. It should be appreciated that, in some embodiments, any suitable number of transformed target images may be generated in a similar manner (e.g., by sampling a number of transformations from a set of predefined transformation) and the transformed target images may be combined (e.g., averaged) to form an average target image.

Returning to FIG. 4, the failure detection engine 116 of FIG. 1 may take as input the original image of the tester (e.g., the tester image 110 of FIG. 1), the average image (e.g., representational tester image 518), and a binary mask (e.g., a predefined binary mask). In some embodiments, the binary mask may be utilized to determine what part of the images (e.g., the original image and the average tester image) to modify.

In some embodiments, a noise image, $x_0^{noise}$, is initialized as a zero matrix. The noise image can be considered a storage container for storing modification made to the original image and average tester image during the optimization method 400. The binary mask may be predefined or user defined. The binary mask and the average tester image may be multiplied to generate a masked average tester image (e.g., a masked version of the representational tester image 518). The binary mask and the original image may be multiplied to generate a masked original image. The initialization of the variables may be expressed by:

$$x_0^{noise} = 0_{w \times h} \odot I^{mask}, x_0^{avg\_mask} = x^{avg} \odot I^{mask},$$
$$x_0^{mask} = x \odot I^{mask}$$

At 406, a new version of the masked original image and the masked average tester image may be calculated. In some embodiments, the new version of the masked average tester image may be a summation of the masked average tester image from the previous iteration, the noise image from the previous iteration, and a matrix of random noise. The use of random noise can aid in avoiding overfitting of the data representing the light pattern to a particular image. The sum of the images may be clipped to cause the values to fall in the range of values that are expected for an image. Similarly, a new masked original image can be generated by summing the masked original image from the previous iteration and the noise image from the previous iteration A deep neural network function f may be applied to the masked average tester image and the masked original tester image. The output of this function can be a vector representation of what each image is identified as (e.g., who's face the facial recognition system identifies the image as).

At 408, a distance between the identified output and the target output can be computed, for both the masked average tester image and the masked original tester image. In some embodiments, the identified output and the target output can be vector representations of a person's identity. In some embodiments, the distances may be identified between the masked average tester image and an averaged target image (e.g., an average of any suitable number of transformed versions of the original target image) and the masked original tester image and the averaged target image.

At 410, a gradient of the combined distance may be calculated. By way of example, the two distance measurements calculated at 408 may be combined in some way with a Fusion function (e.g., addition, averaging, etc.). The gradient of the combined distance with respect to the noise image may be calculated. In particular, the gradient of the fusion function can be calculated with respect to the noise matrix. The gradient can indicate how much the noise image needs to be changed, and in what direction, to bring the average tester image and the original tester image closer to the target image.

At 412, the noise image may be updated based at least in part on the gradient. Using the gradient (e.g., one or more function(s) of the gradient), the noise image may be updated to the noise image from the previous iteration plus some value associated with the gradient. If the algorithm has converged, the gradient may be zero or close to zero, so the noise image may not change significantly between iterations. This may be considered the indication that the optimal values for the masked original tester image and the masked average tester image have been reached. Blocks 406-412 can be repeated any suitable number of times before a zero gradient is reached (e.g., convergence is achieved).

At 414, and after optimizing, the final masked original tester image may be output as a processed tester image (e.g., a tester image that is likely to cause the facial recognition system to misclassify the tester image).

At 416, data representing a light pattern (e.g., the light pattern 118 of FIG. 1) may be calculated by subtracting the original tester image from the last masked original tester image.

It should be noted that while the average tester image is utilized during optimization, it is not provided as output. This is because it is desirable to have the result of the optimization be robust to many variations in the tester image that might be captured by a camera, but ultimately, the output is the pattern that would need to be applied to a single image (e.g., the original tester image).

The method 400 may be expressed with the following notations:

1: Input: average tester image ($x^{avg}$), original tester image (x), and binary mask ($I^{mask}$)

2: Initialize: $x_0^{noise}=0_{w \times h} \odot I^{mask}$, $x_0^{avg\_mask}=x^{avg} \odot I^{mask}$, $x_0^{mask}=x \odot I^{mask}$ The product $\odot$ may denote an entrywise product.
Repeat steps 3-6 until convergence is obtained.
3: Calculate:
   A) a masked version of the average tester image:

$$x_t^{avg\_mask}=\text{clip}(x_{t-1}^{avg\_mask}+x_{t-1}^{noise}+R_{\sim N(\mu,\sigma^2)})$$

$R_{\sim N(\mu,\sigma^2)}$ denotes that the noise distribution is Gaussian with mean $\mu$ and standard deviation $\sigma$ (or variance $\sigma^2$).
   B) a masked version of the original tester image:

$$x_t^{mask}=\text{clip}(x_{t-1}^{mask}+x_{t-1}^{noise})$$

4: Calculate distances based on a distance metric $\mathcal{M}$:

$\mathcal{D}^{avg}=\mathcal{M}(f(x_t^{avg\_mask}),y)$ and $\mathcal{D}=\mathcal{M}(f(x_t^{mask}),y)$ Where y is the target class embedding in an impersonation case and D represents the distance between embeddings. y can be computed from a single image of the target or y may be a representative average target image.
5: Calculate gradient:

$\nabla x=\nabla_x \text{Fusion}(\mathcal{D}^{avg},\mathcal{D})|_{x=x_{t-1}^{noise}}$ Fusion($\mathcal{D}^{avg},\mathcal{D}$) can be one of commonly used fusion technique such as sum, average, or max fusion etc.
6: Update gradient:

$$g_t = \beta \times g_{t-1} + \frac{\Delta x}{\|\Delta x\|_1}, x_t^{noise} = x_{t-1}^{noise} + \alpha \times \text{sign}(g_t)$$

7: Output a processed tester image $x_t^{mask}$ (a tester image that is close enough to a target image to fool the facial recognition system being tested)

It should be appreciated that, in some embodiments, a representational tester image need not be utilized. For example, should multiple transformed tester images be generated, the algorithm for FIG. 4 may be similarly executed for each transformed tester image instead of once using a representational tester image. For these embodiments, the average of the resultant values may be determined after the algorithm has concluded. It should also be appreciated that, in some embodiments, a plurality of target images may be generated in a similar manner as described in connection with FIG. 5, by applying a random set of transformations to the original target image. In examples in which multiple target images are utilized, each of the multiple target images may be utilized to execute the algorithm of FIG. 4 a number of times corresponding to the number of multiple target images. For these embodiments, the average of the resultant values may be determined after the algorithm has concluded. In other embodiments, a representational target image (e.g., an average of many transformed target images) may be generated in a similar manner as described in FIG. 5 with respect to the representational tester image. In those embodiments, the representational target image may be utilized for the calculations provided in the algorithm of FIG. 4. Thus, any suitable combination of a single tester image, multiple tester images, a representational tester image, a single target image, multiple target images, and/or a representational target image may be utilized for the algorithm of FIG. 4.

Although not depicted, the data representing the light pattern can be calibrated for color. The purpose of such calibration is to ensure that the color of the digital domain is the same as the color that subsequently is project by the projector captured from the camera. This condition can be expressed by the formula:

$$\mathcal{C}(x_0+g(Tr(f(x))))=x+f(x)$$

under the assumption: $\mathcal{C}(a+b)=\mathcal{C}(a)+\mathcal{C}(b)$, then:

$$C(x_0) + C(g(Tr(f(x)))) = x + f(x)$$
$$\Rightarrow C(g(Tr(f(x)))) = f(x)$$
$$\Rightarrow Tr = (C \circ g)^{-1}$$

where $x_0$ is the physical tester (in a physical domain), f is the generator function (in a digital domain), $\mathcal{C}$ is a camera function (e.g., a camera function of the digital camera 104 of FIG. 1, in the physical to digital domain), $x=\mathcal{C}(x_0)$ is the digital image of the tester captured by the camera (in the digital domain), $f(x)$ is the data representing the light pattern (in the digital domain), $x+f(x)$ is the digital image of the tester with the light pattern as projected over his face (in the physical domain), g is a projection device function (in the digital to physical domain), $x_0+g(f(x))$ is the physical tester with the light pattern projected on his face (in the physical domain), and Tr is a transformation function needed to ensure that the image captured by the camera is the same as the image generated in the digital domain. The above formulation can be solved using any suitable regression method.

Figure 6:
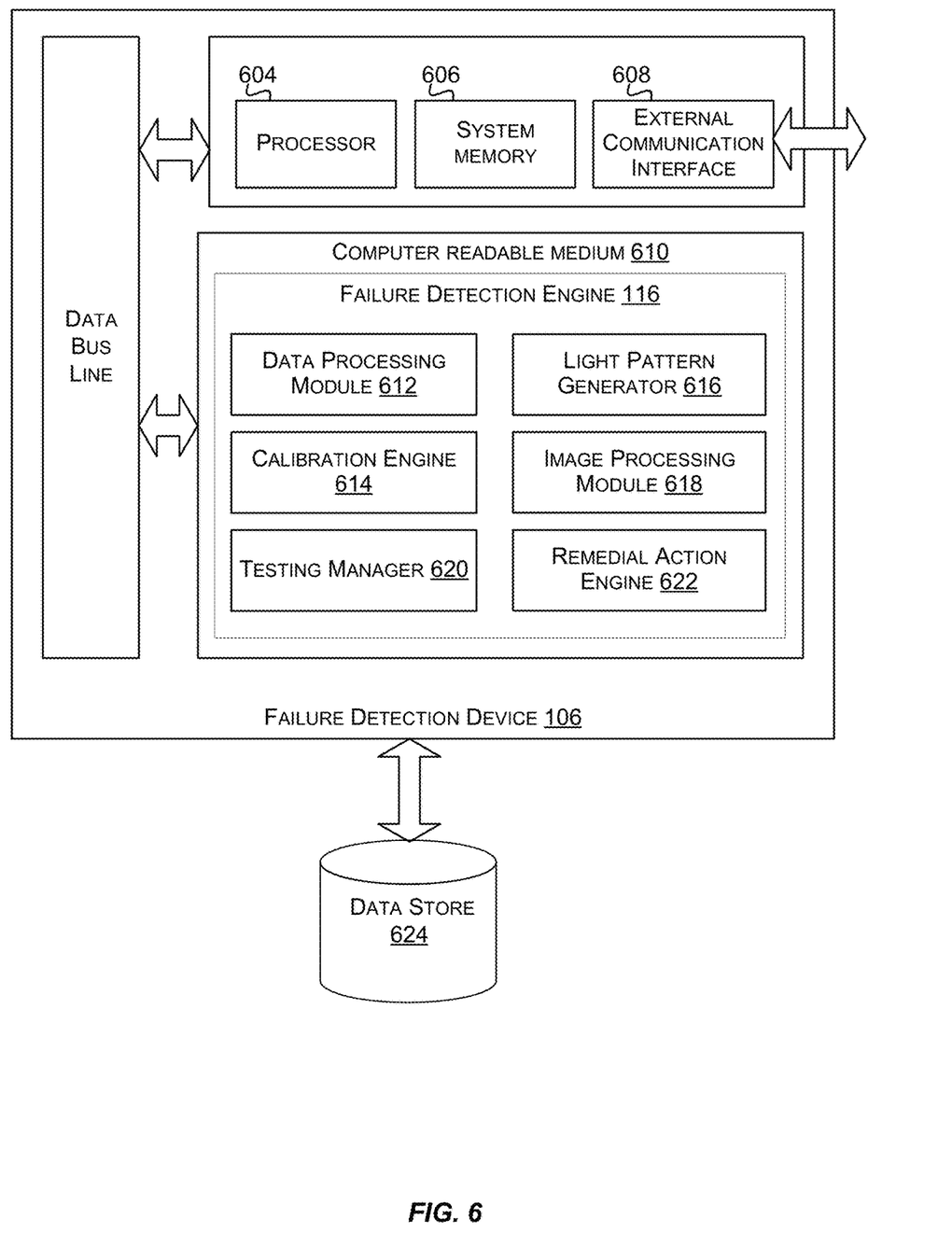
FIG. 6 shows a block diagram illustrating an exemplary failure detection device.

FIG. 6 shows a block diagram illustrating an exemplary failure detection device (e.g., the failure detection device 106 of FIG. 1), according to some embodiments. The failure detection device 106 may include a processor 604. The processor 604 may be coupled to a system memory 606 and an external communication interface 608.

A computer readable medium 610 may also be operatively coupled to the processor 604. The computer readable medium 610 may comprise software that is executable by the processor 604. For example, the computer readable medium 610 may include the failure detection engine 116. The failure detection engine 116 may include a number of software modules executable by the processor 604 such as a data processing module 612, a calibration engine 614, light pattern generator 616, image processing module 618, testing manager 620, and remedial action engine 622. In some embodiments, each, or some subset of the modules of FIG. 6 may be communicatively connected to the data store 624.

The data store 624 may be implemented using various data structures, such as an array, hash map, (linked) list, structured text file (e.g., XML), table, and/or the like. Such data structures may be stored in memory and/or in structured files. The data store 624 may be configured to store any suitable data associated with providing the functionality of the failure detection engine 116 as discussed above.

The data processing module 612 may be configured to cause the processor 602 to receive any suitable data from any suitable source. By way of example, the data processing module 612 may be configured to receive and store one or more images (e.g., one or more tester images, one or more target images, etc.).

The calibration engine 614 may be configured to cause the processor 604 to calibrate an image capture device (e.g., the digital camera 104 of FIGS. 1 and 3 and the projection device 108 of FIGS. 1 and 3. The calibration operations performed by the calibration engine 614 may be the operations discussed above in connection to FIGS. 2 and 3. For example, the calibration engine 614 may be configured to cause the processor 604 to perform the method 200 of FIG. 2. In some embodiments, calibration patterns with known ground truth features (e.g., known reference point locations) can be ca[tired (e.g., by the digital camera 104 as instructed by the processor 604). The projection device 108 can project the captured image (e.g., as instructed by the processor 604) and a second image can be captured (e.g., by the digital camera 104 as instructed by the processor 604). The calibration engine 614 can include code that, when executed by the processor 604 causes the processor 604 to estimate coordinate, color, and/or intensity transformations between the first image and the second image. In some embodiments, the calibration engine 614 may store these transformation in data store 624 for subsequent use.

Once calibration has occurred, an exemplary use case may proceed as follows. A tester (e.g., tester 112 of FIG. 1) may physically stand in front of the digital camera 104 of FIG. 1 and an image of the tester's face may be captured. In some embodiments, the data processing module 612 may receive the image and provide the image to the light pattern generator 616. The light pattern generator 616 (or another module of the failure detection engine 116) may use any suitable facial detection technique (e.g., a landmark detection algorithm utilized to detect landmark points of a face, etc.) to detect the tester's face in the captured image. In some embodiments, the light pattern generator 616 may generate a bounding box of the coordinates of the face which may be in turn used to crop the facial region from the captured image. If cropped, the cropped image can be resized to a predetermined size before being provided as input to a neural network for feature extraction.

The light pattern generator 616 may access a neural network that has been previously trained to extract features of a facial image. The neural network may be a convolutional neural network that has been trained utilizing supervised learning techniques (e.g., utilizing training data including facial examples for which facial features were known). The light pattern generator 616 may be configured to cause the processor 604 to perform the method 400 discussed above in connection with FIG. 4. Method 400 may describe a gradient-based technique that may be used to determine a light pattern that may be projected on a tester's face. In some embodiments, this process may include finding the image that maximizes the loss of the neural network iteratively. The iterative process (e.g., method 400) can be terminated when the processed tester image is determined (e.g., a modified version of the original tester image that is close enough to the target image to likely result in the neural network (e.g., the facial recognition system being tested) to misclassify it as an image of the target. The light pattern generator 616 may calculate the data representing the light pattern based at least in part on subtracting the processed tester image from the original tester image.

The image processing module 618 may be configured to cause the processor 604 to perform the color calibration process discussed above in connection with FIG. 4. In some embodiments, this can make the data representing the light pattern projectable. The image processing module 618 may be configured to cause the pixel values of data representing the light pattern to be modified/clipped so as to adhere to a predetermined fixed range that can be projected (e.g., by the projection device 108 of FIG. 1). In some embodiments, the functionality of the image processing module 618 may be combined with the functionality of the light pattern generator 616 and performed as part of the iterative optimization (e.g., method 400).

In some embodiments, testing manager 620 may be configured to cause the processor 604 to project (e.g., utilizing the projection device 108) the light pattern. The tester may position himself in front of the digital camera 104 such that the light pattern is projected over his face and an image of the light pattern as projected over his face may be captured. The testing manager 620 may be configured to cause the processor 604 to provide the captured image to a facial recognition system (e.g., the facial recognition system being tested). In some embodiments, the facial recognition system may include a neural network (e.g., a convolutional neural network). If the facial recognition system incorrectly classifies the image (e.g., as the target in an impersonation test scenario, or as someone other than the tester in an obfuscation test scenario), the image processing module 618 may cause the processor 604 to perform one or more remedial actions with the remedial action engine 622. In some embodiments, if the facial recognition system incorrectly classifies the image, the data representing the digital light pattern used to generate that image may be gradually perturbed to generate multiple test digital light patterns. In some embodiments, any suitable data representing any suitable number of light patterns can be generated independently for different tester-target pairs. In some embodiments, the test manager 620 can monitor a total number of times the facial recognition system was successfully cause to misclassify an input image.

The remedial action engine 622 may be configured to cause the processor 604 to perform any suitable remedial action in response to receiving output from the testing manager 620. By way of example, the output of the testing manager 620 may include an indication that the input image was successful or unsuccessful at causing the facial recognition system being tested to misclassify the input image. In some embodiments, the remedial action engine 622 may generate an electronic notification via any suitable electronic form of communication such as an email, a text message, a push notification, or the like to communicate to the tester 112 the resulting effect of utilizing the input image to attempt to fool the facial recognition system being tested. In some embodiments, the remedial action engine 622 may be configured to cause the processor 604 to generate a report indicating how many times out of a number of tests was the light pattern(s) successfully used to generate an image that causes the facial recognition system to misclassify the image. In some embodiments, if the facial recognitions system incorrectly classifies the image, the remedial action engine 622 may gradually perturb the data representing the light pattern to generate multiple instances of data representing various light patterns. In some embodiments, the remedial action engine 622 can cause the processor 604 to generate any suitable number of instances of data representing a light pattern using different tester-target image pairs. In some embodiments, the remedial action engine 622 can monitor a total number of times the facial recognition system was successfully cause to misclassify an input image.

TECHNICAL ADVANTAGES

Embodiments of the invention have a number of advantages. For example, by generating a number of transformed images of a tester image and/or of a target image and utilizing these transformed images can generate data representing a light pattern that can be less influenced by the tester's movement in front of the camera. The calibration processes described herein enable the user to calibrate a projector and a camera having different viewpoints and different sets of digital colors. Some conventional techniques may calculate different gradients for each image from a set of images which can be computationally expensive. By utilizing a weighted average image (e.g., a representational tester image), the number of computations can be reduced while still generating an image that is likely to fool the facial recognition system being tested. The proposed methods of utilizing a representational target image can increase the generalization capability of the light pattern such that the pattern may work across different facial recognition systems. Utilizing multiple transformed target images to generate a representational target image which may be used to generate the light pattern can cause the pattern to be resistant to real world transformation (e.g., movement by the tester and/or the projector).

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method for determining accuracy of a facial recognition system, comprising:
   obtaining, by a computing device, a target image depicting a target person enrolled in the facial recognition system and a tester image depicting a tester;
   generating, by the computing device, a plurality of transformed images based at least in part on applying, by the computing device, a plurality of transformations to at least one of: the tester image or the target image;
   generating, by the computing device, a processed tester image based at least in part on the plurality of transformed images, the tester image, and the target image;
   generating, by the computing device, data representing a light pattern based at least in part on the processed tester image;
   providing, by the computing device, the data representing the light pattern to a projection device, the projection device being configured to project the light pattern onto the tester;
   receiving, by the computing device, a subsequent tester image, the subsequent tester image depicting a second person with the light pattern projected on the second person;
   providing, by the computing device, the subsequent tester image as input to the facial recognition system; and
   performing, by the computing device, one or more remedial actions based at least in part on output generated by the facial recognition system.

2. The method of claim 1, wherein the plurality of transformations are sampled from a set of predefined transformations.

3. The method of claim 1, wherein the method further comprises generating a representational image based at least in part on the plurality of transformed images.

4. The method of claim 3, wherein identifying the processed tester image comprises:
   generating a masked tester image based at least in part on the tester image and a binary mask; and
   generating a masked representational image based at least in part on the representational image and the binary mask.

5. The method of claim 4, wherein identifying the processed tester image comprises:
   calculating a modified masked tester image and a modified masked representational image is based at least in part on a matrix of random noise values; and
   storing modifications to the masked tester image as an image.

6. The method of claim 5, wherein identifying the processed tester image further comprises:
   obtaining first output based at least in part on providing the modified masked tester image as input to a neural network function, wherein the first output identifies the modified masked tester image as being of a first subject; and
   obtaining second output based at least in part on providing the modified masked representational image as input to the neural network function, wherein the second output identifies the modified masked representational image as being of a second subject.

7. The method of claim 6, wherein identifying the processed tester image further comprises:
calculating a first distance between the first output and a target output corresponding to the target image; and
calculating a second distance between the second output and the target output corresponding to the target image.

8. The method of claim 7, wherein identifying the processed tester image further comprises generating a combined distance based at least in part on the first distance, the second distance, and a fusion function.

9. The method of claim 8, wherein identifying the processed tester image further comprises calculating a gradient based at least in part on the combined distance and a noise image.

10. The method of claim 9, wherein identifying the processed tester image further comprises;
determining the gradient is less than a predetermined threshold value; and
calculating the processed tester image based at least in part on the masked tester image as most recently modified.

11. A computing device, comprising:
one or more processors;
a memory comprising computer-executable instructions that, when executed by the one or more processors, causes the computing device to:
obtain a target image depicting a target person enrolled in a facial recognition system and a tester image depicting a tester;
generate a plurality of transformed images based at least in part on applying a plurality of transformations to at least one of: the tester image or the target image;
generate a processed tester image based at least in part on the plurality of transformed images, the tester image, and the target image;
generate data representing a light pattern based at least in part on the processed tester image;
provide the data representing the light pattern to a projection device, the projection device being configured to project the light pattern onto the tester;
receive a subsequent tester image, the subsequent tester image depicting a second person with the light pattern projected on the second person;
provide the subsequent tester image as input to the facial recognition system; and
perform one or more remedial actions based at least in part on output generated by the facial recognition system.

12. The computing device of claim 11, wherein the output generated by the facial recognition system indicates the subsequent tester image was incorrectly identified as being an image of the target person enrolled in the facial recognition system.

13. The computing device of claim 11, wherein providing the subsequent tester image as input to the facial recognition system comprises:
calculating a transformation function for modifying the subsequent tester image based at least in part on the light pattern, the tester image, a first function associated with camera capture, a second function associated with projection by the projecting device, and a regression technique; and
applying the transformation function to the subsequent tester image prior to providing the subsequent tester image as input to the facial recognition system.

14. The computing device of claim 11, wherein the plurality of transformed images comprise a plurality of transformed target images and wherein the computing device is further configured to generate a representational target image based at least in part on the target image and the plurality of transformed target images.

15. The computing device of claim 14, wherein identifying the processed tester image is further based at least in part on the representational target image.

16. The computing device of claim 11, wherein the processed tester image is identified based at least in part on minimizing a difference between the tester image with the light pattern projected thereon and the target image.

17. The computing device of claim 11, wherein the processed tester image is identified based at least in part on maximizing a difference between the tester image with the light pattern projected thereon and the target image.

18. The computing device of claim 17, wherein the computing device is further configured to modify the data representing the light pattern according to a set of predefined parameters associated with the projection device.

19. The computing device of claim 18, wherein the tester image depicts a first face of the tester and the target image depicts a second face of the target person.

20. The computing device of claim 11, further comprising modifying colors of the data representing the light pattern to adjust for at least one of: projection or eventual camera capture.

* * * * *